G. HALLIDAY.
SIEVE BOLTER.
APPLICATION FILED MAY 17, 1911.
1,038,124.
Patented Sept. 10, 1912.
3 SHEETS—SHEET 1.
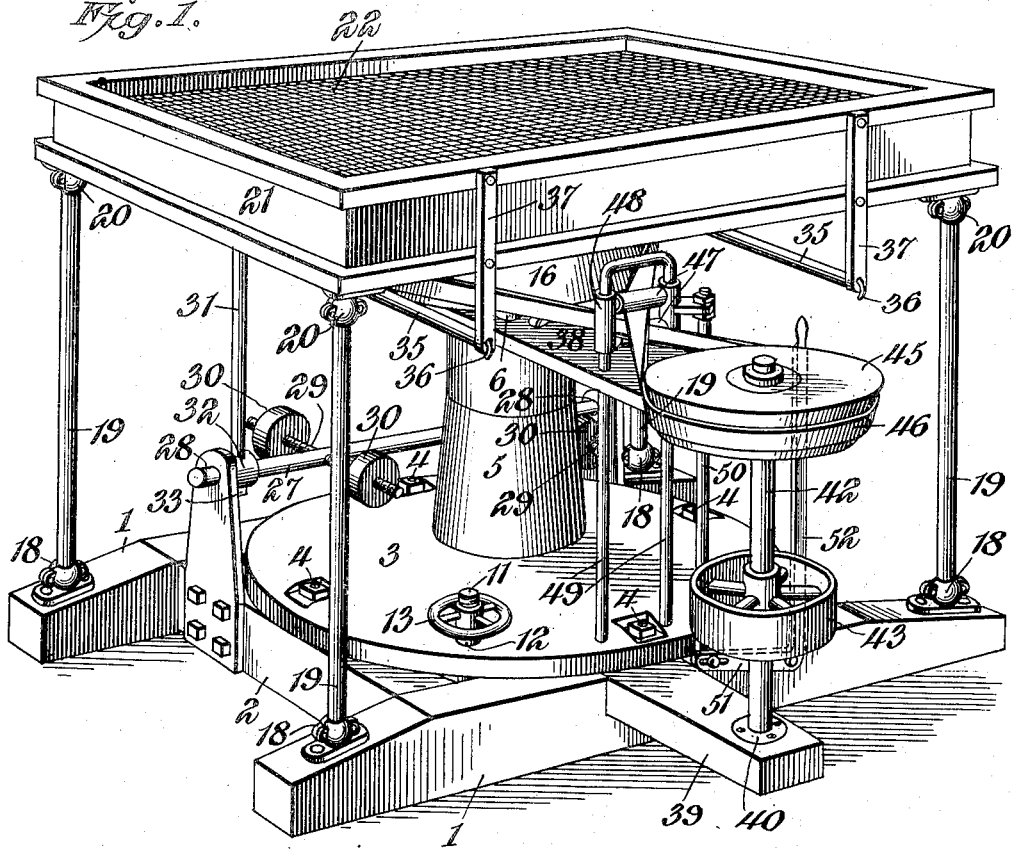
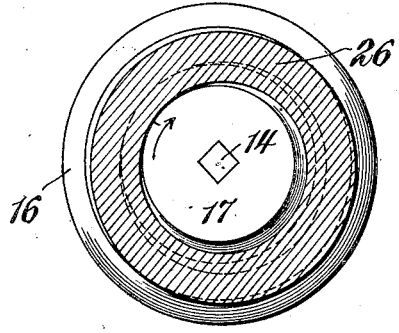
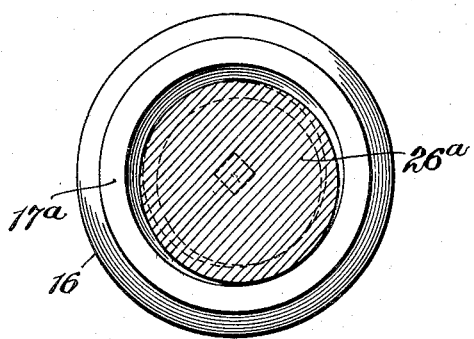
Witnesses
Howard D Orr
F. T. Chapman
George Halliday, Inventor,
By C. G. Siggers
Attorney

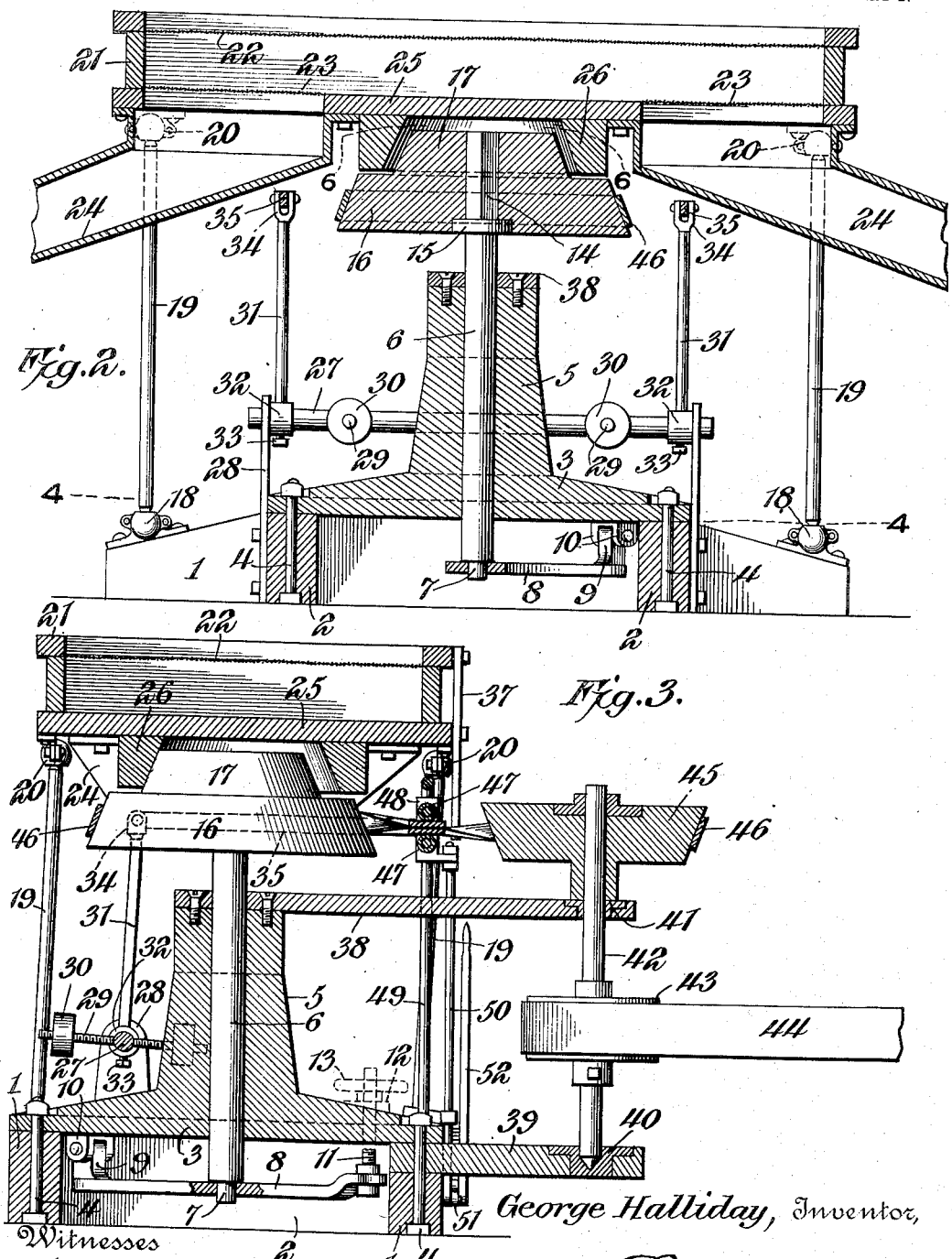

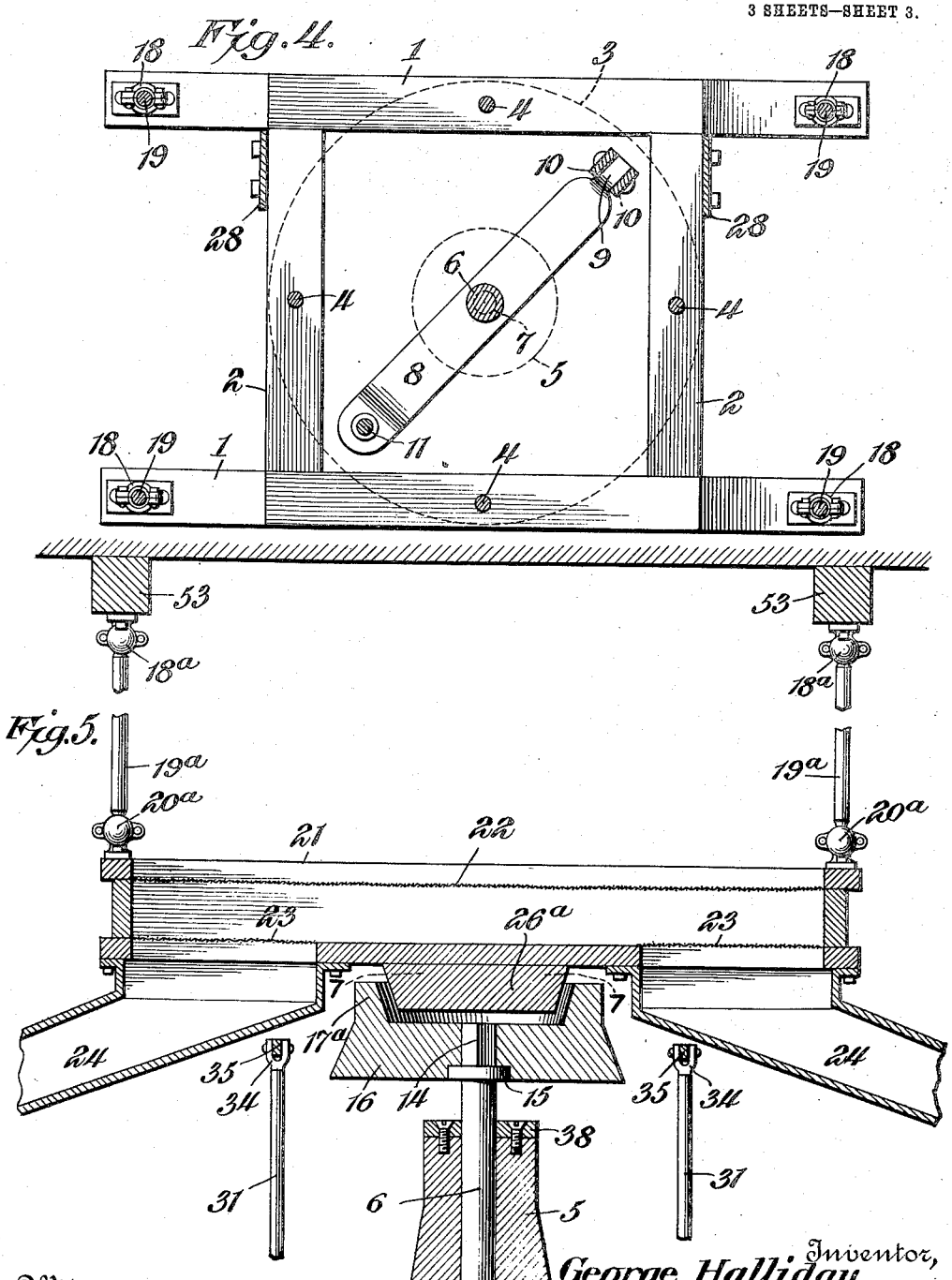

UNITED STATES PATENT OFFICE.

GEORGE HALLIDAY, OF TACOMA, WASHINGTON, ASSIGNOR, BY DIRECT AND MESNE ASSIGNMENTS, OF ONE-THIRD TO JOHN DILL ARMSTRONG, OF TACOMA, WASHINGTON, AND ONE-THIRD TO CHARLES A. BLACK, OF OAKLAND, CALIFORNIA.

SIEVE-BOLTER.

1,038,124.  Specification of Letters Patent. Patented Sept. 10, 1912.

Application filed May 17, 1911. Serial No. 627,834.

*To all whom it may concern:*

Be it known that I, GEORGE HALLIDAY, a citizen of the United States, residing at Tacoma, in the county of Pierce and State of Washington, have invented a new and useful Sieve-Bolter, of which the following is a specification.

This invention has reference to improvements in sieve bolters, although not confined to use in connection specifically with a sieve bolter, for the invention may be adapted to any other sieve, or any other structure where a gyrating motion is desired.

The object of the present invention is to impart to the sieve a gyrating motion of comparatively high speed from a slow speed drive, and to provide means whereby the speed of the motion of the sieve may be regulated at will without the necessity of stopping the machine.

In accordance with the present invention the sieve is mounted for universal movement in a limited zone and a gyrating motion is imparted to the sieve by a rotatable drive member acting on a portion of the sieve which may be designated the driven member in a manner to impart a comparatively high rate of gyratory movement to the sieve without any positive connection between the drive member and the driven member. Provision is made for the adjustment of the drive member with relation to the driven member to vary the throw of the driven member and consequently the extent of gyratory movement, and provision is further made for varying the speed of the drive member without corresponding variation of the prime mover, so that the rate of movement of the sieve may be regulated at the will of the operator.

The invention will be best understood from a consideration of the following detailed description, taken in connection with the accompanying drawings forming a part of this specification, with the understanding, however, that while in the drawings there are illustrated practical embodiments of the invention, the showing of the drawings by no means exhausts the various forms which the invention may assume, but are simply indicative of the capabilities of the invention for modifications and changes, wherefore the invention is not limited to the structures illustrated.

In the drawings:—Figure 1 is a perspective view of a sieve bolter embodying the invention. Fig. 2 is a longitudinal vertical section thereof with some parts shown in elevation. Fig. 3 is a vertical central section at right angles to the section of Fig. 2. Fig. 4 is a section on the line 4—4 of Fig. 2. Fig. 5 is a section similar to Fig. 2 but omitting some of the structure shown in Fig. 2 and illustrating a different manner of supporting the sieve and a different type of drive and driven members from that shown in Fig. 2. Fig. 6 is a detail view of the drive and driven members with the driven member in section on the line 6—6 of Fig. 2. Fig. 7 is a similar view of the drive and driven members of the modification shown in Fig. 5 with the driven member in section on the line 7—7 of Fig. 5.

Referring first to the structure shown in Figs. 1, 2, 3, 4 and 6, there is shown a basic frame made up of longitudinal timbers 1 and cross timbers 2, but it will be understood that this frame may be indicative of any suitable support. The frame made up of the timbers 1 and 2 supports a platform 3 held to the basic frame by bolts 4, or in any other suitable manner, and this platform has erected on it a post or standard 5, centrally through which extends a shaft 6, which latter is, when the machine is in operative position, upright, and at the lower end this shaft is formed with a step 7 having a bearing in a supporting bar 8 lodged in the space below the platform 3. One end of the bar 8 is provided with a lug 9 pivoted between ears 10 made fast to the bottom of the platform 3 at one corner of the chamber formed by the side members 1 and end members 2. The other end of the bar 8 has swiveled to it a threaded rod 11 passing upward through the platform 3 and through a boss 12 thereon and there receiving a hand wheel 13, having its hub threaded to operate as a manipulating nut for the threaded rod 11, whereby the corresponding end of the bar 8 may be elevated or lowered with the other end turning about the pivot support in the bracket 10, and this raising and lowering of the bar 8 will be participated in by the shaft 6, so that the latter will also be raised or lowered, as the case may be.

The structure just described provides a simple and efficient means for the vertical adjustment of the shaft 6, the term vertical being here used with reference to the normal position of the shaft in operation, although slight variations from a true vertical are immaterial and the term is to be understood as including any permissible variations from the true vertical. Furthermore, other terms of position used herein are to be understood with reference to the ordinary working position of the machine, and to include such variations from the true meaning of the terms as are not material to the operation of the machine.

The upper end of the shaft 6 rises above the top of the post or standard 5 and may be squared as indicated at 14 and provided with a collar 15, but it will be understood that these particular embodiments of the shaft are not mandatory, since other means for performing the same functions may be provided. The squared portion 14 of the shaft is fitted to a like axial passage through a head 16, which head is also provided with a counter-sunk portion for the reception of the collar 15. The head 16 has the lower portion of an appropriate diameter and frusto-conical with the top and bottom surfaces parallel, while rising from the upper surface of the body portion of the head 16 is a frusto-conical boss 17 concentric with the body of the head 16, but of less diameter, and this boss 17 terminates at the upper end of the shaft 14, the upper surface of the boss being parallel with the lower surface of the head, although this is not at all mandatory.

The side members 1 of the basis frame extend at each end beyond the end members 2 and there carry socket bearings 18 for the ball ends of rods 19, the said ends of the rods 19 and sockets 18 constituting ball and socket joints. The other or upper ends of the rods 19 terminate in suitable balls inclosed in socket bearings 20, which in turn are secured to the corresponding corners of a sieve frame 21, which, as shown in the drawings, is of general rectangular form carrying screens 22, 23 of appropriate mesh, these screens being customarily made of woven wire, but this does not preclude the making of these screens of other material. The screens 22 and 23 are separated by an appropriate distance, and the frame 21 is open at the end portions of the bottom where the frame 21 carries chutes 24 or other means of disposition of material passing through the screens. The particular screen structure does not constitute a part of the present invention and need not be specifically described, nor is the invention at all limited in any manner to the particular screen structure illustrated, the showing of the drawings being indicative of any sieve or screen structure, or of any other device or structure to which gyratory motion is to be imparted.

The screen frame 21 has secured to its under face on a cross beam 25 a socket member 26, which in the particular instance under consideration has its inner walls of frusto-conical shape expanding from the beam or plate 25 downwardly. The interior of the socket member is designed to receive the boss 17 and the slope of the inner walls of the socket member conforms to the slope of the periphery of the boss 17, but the diameter of the interior of the socket member is somewhat greater than the diameter of the boss 17 for a purpose which will hereinafter appear.

Since the screen frame 21 is mounted on the upper ends of the rods 19 which are connected to the screen frame by ball and socket joints, and also connected to the side members 1 by ball and socket joints, the support for the frame 21 so far as the rods 19 are concerned, is unstable, although the boss 17 entering into the socket member 26 prevents any movement of the frame 21 beyond a small limit determined by the difference between the internal diameter of the socket member 26 and the diameter of the boss 17. In operation it is desirable to balance the frame 21 to an appropriate extent, and for this reason there is provided a rock shaft 27 mounted at the ends in bearings 28 rising from the end members 2 near one of the side members 1. The shaft 27 has near each end and projecting from opposite sides, bars 29 in substantially radial relation to the axis of rocking of the shaft, and these bars are threaded and receive weights 30 suitably threaded to screw along the bars 29 to any desired extent. The shaft 27 also carries arms 31, by means of collars 32, formed on or attached to one end of each arm 31 and held to the shaft 27 by set screws 33. The arms 31 extend in an approximately upright direction toward the screen frame 21, but stop short of the same and may terminate in bifurcated ends 34. Each arm 31 at its bifurcated end receives one end of a link 35, the other end of which latter may be formed into a hook 36 engaging the lower end of a downwardly directed arm 37 fast to the corresponding side of the frame 21. The weights 30 serve to balance the sieve frame when in operation, and by screwing the weights toward or from the shaft 27, equilibrium may be readily established.

Fast to the top of the post or standard 5 is one end of a strip 38, the other end of which extends in a substantially horizontal direction beyond one of the side members 1, and fast to the same side member is another strip 39 directly under the outer end of the strip 38. The strip 39 carries a step bearing 40 and the strip 38 is provided with a member 41 for an upright shaft 42, the lower end of which is received in the bearing 40. This shaft between its bearings has applied thereto a pulley 43, which may receive power by a belt 44, or this shaft may be driven in any appropriate manner. The shaft 42 above the strip 38 carries a conical pulley 45 oppositely directed with relation to the head 16. Connecting the pulley 45 with the body of the head 16 is a belt 46, this belt being preferably, though not necessarily, crossed between the pulley 45 and the body of the head 16, which latter also acts as a pulley. The belt where crossed passes between rollers 47 mounted in a frame 48, the side members of which are capable of sliding on upright guides 49, the frame being under the control of a link 50 secured at one end to the frame, and at the other end to the short arm 51 of a manipulating member 52, so that the frame 48 may be moved at will lengthwise of the guides 49 to thereby shift the belt 46 in the direction of the length of the axes of the shafts 6 and 42. Because the conical members 16 and 45 are oppositely directed, the belt will at all times remain tight, but the rate of transmission will be varied in the same manner as occurs with multi-speed cone pulley transmission.

The action of the head 16 upon the screen 21 through the socket member 26 is such that at each complete rotation of the shaft 6 there is imparted to the screen 21 a comparatively large number of gyrating movements, the extent of these movements being determined by the difference in diameter of the interior of the socket member 26 with relation to the diameter of the boss 17, since it is the boss or disk 17 which causes the actuation of the screen frame 21 in its gyratory movements. In the normal position of rest, the socket member 26 engages at some point the periphery of the boss 17. If, now, rotative movement be imparted to the head 16 by the pulley 45 and belt 46, the frictional engagement of the boss 17 with the inner wall of the socket member causes the latter to move, but the motion of the screen 21 and with it the socket member 26 is determined by the supporting rods 19, the upper ends of which are constrained to move in circles, since the lower ends of these rods are universally mounted in the sockets 18. The result of this is that the point of contact of the boss 17 with the inner wall of the socket 26 is constantly shifting, so that the screen 21 moves in a small circle, the diameter of which is equal to the difference between the diameter of the boss 17 and the inner diameter of the socket 26. Let it be supposed that the socket 26 in Fig. 6 is rolling about the outer wall of the boss 17 in a counter-clockwise direction as viewed in said figure. If the point of contact between the boss 17 and the inner wall of the socket 26 be considered in Fig. 6 as about the ten o'clock position, with reference to the dial of a time piece, then when the socket 26 has rolled around the exterior of the boss 17 until the same point on the boss makes contact with the inner wall of the socket 26, this point will be found to have advanced in a clockwise direction until it has reached say the eleven o'clock position, assuming the internal diameter of the socket and the external diameter of the boss are related to cause such advancing of the point of contact, and on a second movement of the socket about the outer wall of the boss 17, this point will be found to have advanced to say the twelve o'clock position, so that under the conditions assumed the socket 26 will have gyrated around the boss 17 twelve times to one complete rotation of the boss 17 on its axis. If now the axis of rotation of the boss 17 be considered as fixed in space, and the boss be rotated in the direction of the arrow in Fig. 6, the socket 26 though not rotating will move bodily in space around the boss 17 and will travel twelve times in a small circle agreeable to the difference in diameter between the boss 17 where contacting with the socket 26 and the internal diameter of said socket, but the direction of gyration of the socket 26 and consequently of the screen frame 21 carrying said socket, will be counter-clockwise if the direction of rotation of boss 17 be clockwise, and the speed of movement or gyration of the frame 21 will be largely multiplied with reference to the speed of rotation of the boss 17 or the shaft 6 which carries the boss 17. In an actual embodiment of the invention with the boss 17 having an outer diameter of twenty inches and the socket 26 having an inner diameter of twenty-four inches, a rotation of the boss at the rate of fifteen per minute produced two hundred and eighty gyrations of the socket per minute. Any material to be treated deposited upon the screen 22 will be subjected to the gyratory motion of the screen and not only distributed over the screen but particles of sufficiently small size will readily find their way through the screen 22 and ultimately through the screen 23 into the chutes 24. By shifting the belt 46 with relation to the pulley 45 and head 16, the speed of rotation of the shaft 6 and consequently the speed of gyration of the screen frame 21 is readily controllable without any necessity of change in the speed of the shaft 42, which latter may be consequently driven at a uniform speed. Should it be found advisable to change the degree of gyration, this is readily accomplished by raising or lowering the shaft 6, which will change the proportion between the diameter of the boss 17 where active and the diameter of the socket 26 where engaged by said boss.

It is not necessary that the drive member be in the form of a boss and the driven member be in the form of a socket entered by the boss, nor is it necessary that the screen member be supported on the upper ends of freely mounted rods, for these conditions may be reversed, as in the structure of Fig. 5, where the screen member 21 is hung on the lower ends of rods 19ª carried by sockets 18ª from suitable supporting beams 53, while the lower ends of the rods 19ª are connected to the screen frame 21 by universal couplings 20ª. The screen frame 21 is, therefore, pendently hung with the same freedom of universal movement in a substantially horizontal plane as is the case in the structure shown in the other figures. Moreover, the head 16 is formed with an upstanding annular flange 17ª of flaring form on the interior to form a flaring socket entered by a taper boss 26ª. Otherwise the relation of the parts is the same as already described with reference to the other figures and the action is the same except that in the structure shown in Figs. 5 and 7 the direction of gyration of the frame 21 is the same as the direction of rotation of the shaft 6 and parts carried thereby, this being due to the fact that the drive member 17ª is exterior to the driven member 26ª, instead of being interior thereto as in the other form.

In both forms of the invention the drive member constitutes the sole constraining means for the driven member which prevents said driven member from moving off at a tangent and confines its movements to gyrations of comparatively small diameter.

It is to be observed that the drive and driven members whereby the gyratory movement is brought about are shown as tapered. While this form is preferred, since it permits variation in the throw of the screen frame 21 by longitudinal adjustment of the shaft 6, the gyratory movement may be brought about if the walls of the two members were cylindrical, and consequently the invention is not limited to the use of taper or frusto-conical drive and driven members.

Of course, it will be understood that when the frame 21 is pendently supported, the supporting members 53 may form part of the general frame of the machine and may be otherwise connected to the frame 21 than the particular showing of the drawings.

The capability of varying the throw of the screen is a feature of moment, since it permits the operator to regulate the spread of the stock on the sieve by varying the gyratory throw of the sieve, thus permitting the operator to set the machine for a short throw, which is sufficient to thoroughly spread a dry substance, while a sticky or clammy substance requires a much longer throw to thoroughly spread it, and this may be done at any time without stopping the machine.

The capability of varying the speed of the sieve without the necessity of varying the speed of the prime mover is of moment, since it is found in practice that a sieve will at times sift too freely and produce undesirable results, while at other times it will not sift freely enough. This permits the operator to control the product to a nicety.

The invention has been described with particular reference to its use as a sieve or screen, but it will be understood that the means for producing the gyratory movements may be utilized wherever such movements are desirable.

What is claimed is:—

1. In a machine for the purpose described, a drive element and a driven element, one surrounding the other and the surrounding element having a greater internal diameter than the diameter of the other element, one of the said elements having a fixed axis of rotation, and the other element being mounted for gyratory movement with relation to the axis of rotation of the first named element and provided with means for holding it against rotation about its own axis, the gyratory movement of the second named element being caused by the rotative movement of the first named element and said drive element constituting the sole constraining means for maintaining the driven member in engagement with the drive member.

2. In a machine for the purpose described, a drive element having a circular contour, all points of which rotate concentrically with relation to the axis of rotation, and a driven element having a circular wall adapted to engage the circular wall of the drive element and provided with means for holding it against rotation about its own axis, one element being in inclosing relation to the other element and of greater internal diameter than the diameter of the other element, the driven element being impelled and constrained by the drive element to move in a gyratory path about the axis of rotation of the drive element, and the diameter of the gyratory path being determined by the respective internal and external diameters of the two elements.

3. In a machine for the purpose described, a rotatable drive element provided with means for adjusting it in the direction of the axis of rotation and having a circular active wall tapering in one direction, a driven element also having a circular active wall tapering in the same direction as the taper of the wall of the drive element, one element being in surrounding relation to the other element and of greater internal diameter than the external diameter of the said other element, the driven element being mounted for gyratory movement by and with relation to the drive element due to the difference in the diameters of the active portions of the respective elements.

4. In a machine for the purpose described, a rotatable drive member having a circular portion, a device mounted for gyratory movement and provided with a driven member in coactive relation to the drive member, the drive and driven members being one in surrounding relation to the other, and the surrounding member being of larger internal diameter than the external diameter of the other, means for holding said device and the driven element against bodily rotative movement and means for imparting rotative movement to the drive member to cause gyratory movement of the said device to an extent equal to the difference between the internal diameter of one element and the external diameter of the other where in coactive relation, the drive member constituting the sole constraining means for maintaining the driven member in engagement with the drive member.

5. In a machine for the purpose described, a drive element comprising a head mounted on a shaft and provided with an axially tapered extension, a supporting means for the shaft provided with means for moving the shaft in the direction of its length, a device having supports on which it may have gyratory movement, means for imparting rotary motion to the drive member, and a driven member carried by the said device, the drive and driven members being so related that one surrounds the other and the driven member being tapered in accordance with the taper of the drive member, the internal diameter of the surrounding member being greater than the external diameter of the interior member to determine the amount of gyratory movement imparted to the said device.

6. In a machine for the purpose described, a rotatable drive member and a driven member engaged and actuated by the drive member to freely gyrate with respect to the latter, the drive and driven members being one in surrounding relation to the other and of larger internal diameter than the external diameter of the other to provide free space for and to determine the amount of gyratory movement of the driven member, and the driven member being provided with means for holding it against bodily rotative movement.

7. In a device for the purpose described, a drive member having an extended active portion moving progressively, and a driven member actuated by the drive member to gyrate about the latter by the progressive rolling engagement therewith of successive portions of the driven member, the portions of the two members in engagement at any one time constituting but a small fractional part of the extent of the active portions thereof, the drive member constituting the sole constraining means for maintaining the driven member in engagement with the drive member, and the driven member being provided with means for holding it against bodily rotative movements.

8. In a device for the purpose described, a bodily rotative drive member having a fixed axis of rotation concentric therewith, and a non-rotatable driven member movable with respect to the drive member in free eccentric relation thereto, the drive member actuating the driven member by a constantly shifting engagement therewith of limited area with respect to the extent of active surface of drive and driven members capable of engagement, and constituting the sole constraining means for maintaining the driven member in engagement with the drive member, and the driven member moving about the axis of rotation of the drive member in a path determined by the relative diameters of the active or engaging faces of the drive and driven members.

9. In a machine for the purpose described, a drive element comprising a shaft having a head at one end thereof, said head constituting a pulley and having an axial tapered extension, means adapted to the pulley portion of the head for driving the same rotatively, means for moving the shaft in the direction of its length, a device having freely movable supports, and an axial tapered member adapted to the tapered extension of the drive member to be engaged thereby, the engaging portions of the drive and driven members being of relatively different diameters with one in surrounding relation to the other.

10. In a machine for the purpose described, a device having supports for holding it against rotative movement and permitting it to move in a circular path, a driven member carried by and fast to the device, a counter-balancing means for the device, and a drive member in coactive relation to the driven member and having a fixed axis of rotation, one of said members being interior to the other member, and one of said members being also of larger internal diameter than the external diameter of the other member to provide free space for and determining the extent of non-rotative movement of the driven member.

11. A device for the purpose described comprising a bodily rotatable drive member, and a non-rotatable driven member, each having an active surface adapted to engage the active surface of the other and the active surface of one being of less circumferential extent than that of the other, the drive member being capable of rotative movement and the driven member having imparted thereto by the drive member a gyratory movement of greater speed than the rotative movement of the drive member, said difference in speed being proportionate to the difference in extent of the active surfaces of the drive and driven members, and a drive member constituting the sole constraining means for maintaining the driven member in engagement with the drive member.

12. In a machine for the purpose described, a frame, spaced supporting means for the frame holding the same against rotative movement and permitting the frame to otherwise move freely in a circular path, a rotatable drive member mounted independently of the frame, and a driven member fast on the frame, the drive and driven members being one in encircling relation to the other with the encircling member of larger internal diameter than the corresponding portion of the interior member, the driven member being actuated by the drive member and rolling with relation to the other in a circular path of a diameter determined by the difference in the diameters of the drive and driven members where in active relation one to the other.

13. In a machine for the purpose described, a rotatable drive member having a fixed axis of rotation and a driven member having a range of movement with relation to the axis of rotation of the drive member to move in a circular path, and means for preventing the driven member from bodily rotating about the axis of rotation of the drive member, the drive member constraining the driven member to move in such circular path by the action of centrifugal force holding the driven member in engagement with the drive member.

14. In a machine for the purpose described, means for causing a non-rotative circular movement of a driven member by a slower rotative movement of a drive member comprising a disk shaped member and a ring shaped member in encircling relation to the disk shaped member, the ring shaped member having an internal diameter proportioned to the external diameter of the disk shaped member to determine the extent of circular movement imparted to the driven member, and the said driven member being provided with means for holding it against rotative movement about its own axis.

15. A means for imparting a rapid non-rotative circular movement to a driven member by a slower rotative movement of a drive member, comprising a disk shaped member and a ring shaped member in encircling relation to the disk shaped member with the internal diameter of the ring shaped member larger than the external diameter of the disk shaped member to determine the extent of throw of the driven member, and means for regulating the speed of rotation of the drive member while the parts are in motion.

16. A means for imparting a rapid circular non-rotative movement to a driven member by a rotative movement of a drive member and for varying the extent of the movement of the driven member, comprising a disk shaped member and a ring shaped member in surrounding relation to the disk shaped member and both tapering in the same direction, the ring shaped member being of larger internal diameter than the exterior diameter of the disk shaped member to determine the extent of throw of the driven member, and means for moving one member axially with relation to the other member without stopping the rotative movement of the drive member.

In testimony that I claim the foregoing as my own, I have hereto affixed my signature in the presence of two witnesses.

GEORGE HALLIDAY.

Witnesses:
R. M. CLAGETT,
WILLIAM SCHLARO, Jr.